United States Patent [19]

Inami et al.

[11] 4,205,903
[45] Jun. 3, 1980

[54] WRITING/ERASING TECHNIQUE FOR AN ELECTROCHROMIC DISPLAY CELL

[75] Inventors: Yasuhiko Inami, Nishinomiya; Sadatoshi Takechi; Hiroshi Nakauchi, both of Nara; Hiroshi Hamada, Tenri, all of Japan

[73] Assignee: Sharp Kabushiki Kaisha, Osaka, Japan

[21] Appl. No.: 15,757

[22] Filed: Feb. 27, 1979

Related U.S. Application Data

[63] Continuation of Ser. No. 739,259, Nov. 5, 1976, abandoned.

[30] Foreign Application Priority Data

Nov. 6, 1975 [JP] Japan ................................ 50-133721

[51] Int. Cl.$^2$ .............................................. G02F 1/17
[52] U.S. Cl. .................................... 350/357; 340/785
[58] Field of Search ................. 350/357; 340/763, 785

[56] References Cited

U.S. PATENT DOCUMENTS

| 3,912,368 | 10/1975 | Ponjee et al. | 350/357 |
| 3,930,717 | 1/1976 | McDermott et al. | 350/357 |
| 3,950,936 | 4/1976 | Oguey et al. | 340/785 |

*Primary Examiner*—James W. Davie
*Attorney, Agent, or Firm*—Birch, Stewart, Kolasch & Birch

[57] ABSTRACT

For an electro-optical display having an electrochromic material provided with a redox pair and sandwiched between a pair of electrodes, a first potential more negative than the threshold potential is applied and a second potential more positive than the first potential but more negative than the threshold potential is thereafter applied in a write mode.

7 Claims, 4 Drawing Figures

WRITING/ERASING TECHNIQUE FOR AN ELECTROCHROMIC DISPLAY CELL

This application is a continuation of copending application Ser. No. 739,259, filed on Nov. 5, 1976, now abandoned.

BACKGROUND OF THE INVENTION

The present invention relates to a driving technique for an electro-optical display which utilizes variations in the light absorption properties upon application of properly controlled potentials.

In the art of electro-optical displays, transition metal oxide materials of for example tungsten oxide ($WO_3$), molybdenum oxide ($M_oO_3$) or titanium oxide ($T_iO_2$), organic materials of for example viologen derivatives (4,4' bipyridinium derivatives), etc. are well known as electrochromic materials employed for display purposes. Although in the following description the present invention will be discussed and illustrated with respect to the bipyridinium derivatives, it is obvious that the principle of the present invention is equally applicable to other electrochromic materials. Other materials employed instead of the 4,4' bipyridinium derivatives are 2,2' bipyridinium derivatives; 2,4' bipyridinium derivatives; 2-(2',4' dinitrobenzyl) pyridine; N,N'-dimethyl 9,9'-biacridinium dinitrate: etc. See, for example, British Pat. No. 1,302,000 of PHILIPS ELECTRONIC AND ASSOCIATED INDUSTRIES LTD. and entitled IMAGE DISPLAY APPARATUS.

A scheme of such an electrochromic display cell is shown in FIG. 1. As shown herein, on a substrate 1 of glass, ceramics or plastics there is first deposited an electrically conductive coating 2 of inert metal, indium oxide ($In_2O_3$), tin oxide ($SnO_2$), etc. A layer of insulator 3 made of oxides such as silicon monoxide (SiO), silicon dioxide ($SiO_2$) and aluminium oxide ($Al_2O_3$), or fluorides such as magnesium fluoride ($MgF_2$) or polymer material such as resist ink and photoresist, is then deposited on only a non-display region, that is, a region not serving for display purposes. The conductive coating 2 in combination with the insulator layer 3 having a desired pattern defines the corresponding display pattern. The conductive coating 2 may be termed display electrodes. A layer of the electrochromic material 4 (for example, the bipyridinium derivative as listed above) is further deposited thereon. In case where the electrochromic materials are fluid, a second substrate 8 of glass, ceramics or plastics is additionally provided such that the electrochromic material 4 may be injected via a spacer 5 into a cavity between the two substrates 1 and 8. The spacer 5 may be made of a glass rod or plastic rod. A counter electrode 6 and, if necessary, a reference electrode 7 are deposited on the second substrate 8. The counter electrode 6 may be made of inert metal, tungsten oxide ($WO_3$) or resin-like carbon, while the reference electrode 7 may be made of indium oxide ($In_2O_3$). The resulting electrochromic display cell is analogous in construction to the conventional liquid crystal display cells with exceptions that while the former manifests color reactions at the interface between the electrochromic material containing layer (solid, gel or fluid) and the display electrodes, in case of the latter changes in the optical characteristics occur only on the portion which is sandwiched between the two electrodes and a voltage is applied thereto. There is observed another difference that when a constant potential driving technique effective to hold the potentials of the display electrodes constant is employed, the electrochromic display needs the provision of the reference electrode in addition to the counter electrode.

These electrochromic displays are of greater advantage than the prior art displays because of its lower power and memory capacity. The memory capacity means that the display is capable of holding its display state after being electrically free from a driving circuit and thus the display requires no power dissipation at this time. These advantageous characteristics are found very useful within a wide range of fields where the frequency of occurrence of changes in the display state is relatively small and the requirement for lower power dissipation is rigid.

When the bipyridinium derivative for example is employed, the bipyridinium derivative is reduced about the display electrodes or cathodes so that insoluble colored species are deposited on the surfaces of the electrodes to effect the color reactions. Upon the reversal of the polarities of these electrodes, the derivative is oxidized to restore to its original state. Accordingly, the memory characteristics will be further enhanced if the oxidative species are removed during the fabrication of the display cells. However, difficulties are experienced to erase the colored state. Repeated write-erase cycle permits the colored species to be accumulated on the electrodes to thereby shorten the operating life of the display cells. To overcome the above discussed difficulties, a redox pair (for example, $Fe^{2+}$ and $Fe^{3+}$) is added which has an appropriate redox potential (preferably, 0.1-1 V higher than the redox potential or the oxidation-reduction potential of bipyridinium derivatives). Another example of the redox pair is tetrachlorohydroquinone/tetrachloroquinone. In these cases, erasure is readily effected and overvoltage at the counter electrode is minimized. Also, the driving voltage is reduced. Notwithstanding these improvements, difficulties still remain in that the memory characteristics are considerably declined.

Accordingly, it is an object of the present invention to provide an improved driving manner for electrochromic display cells which is capable of overcoming the shortcomings experienced in the prior art. In accordance with the concept of the present invention, two step potentials are applied to the electrochromic display cells during a single write-erase cycle. In other words, the present invention is characterized by the driving technique for the electrochromic display wherein a redox pair having an appropriate redox potential is added to bipyridinium derivative, for example, diheptyl viologen dipromide (N,N'-diheptyl 4,4' bipyridinium dibromide), the driving technique being capable of enhancing the memory capacity of the electrochromic display.

BRIEF DESCRIPTION OF THE DRAWINGS

A better understanding of the invention may be had from a consideration of the following detailed description taken in conjunction with the accompanying drawings in which.

DETAILED DESCRIPTION OF THE INVENTION

As is well known, an electro-optical display consists of influencing the light absorption of reflection properties of a material by a reversible electrochemical transformation. The application of "electrochromic" materials can be included in this category, the term electrochromic being used herein to designate various displays with the property of having at least two states where light absorption or reflection properties are different.

When the electrochromic materials employed for electro-optical displays are viologen derivatives, tungsten oxide, etc., they are colorless in their oxidized state and colored in their reduced state. In other words, the electro-optical display has the first absorption state in a write mode and the second light absorption state in an erase mode. However, there are found electrochromic materials which are colored in the oxidized state, and electrochromic materials which are colored with differency in hue in both the oxidized state and the reduced state.

Pursuant to the concept of the present invention, an improved constant potential driving technique is provided for an electro-optical display containing the so-called electrochromic material. The electro-optical display comprises the electrochromic material of which the visible light absorption property is reversibly varied by an electrochemical redox reaction, a redox pair which coexists with the electrochromic material, an electrolyte provided if necessary, a predetermined number of display electrodes, a reference electrode, a counter electrode and supporting means for supporting these components. Out of the two different visible light absorption states of the electrochromic material, one of which the equilibrium potential $E_1$ is negative (that is, the reduced state) is referred as the first absorption state whereas the other of which the equilibrium potential $E_2$ ($E_1 < E_2$) is positive (that is, the oxidized state) is referred as the second absorption state. When the display state of the display electrodes is desired to change from the first absorption state to the second absorption, the display electrodes are held at a potential $E_2'$ more positive than the above stated $E_2$ ($E_2' > E_2$) for a predetermined period of time ($t_2$) and then held at $E_2$ for the purpose of maintaining the second absorption state. It will be noted that the equilibrium potentials $E_1$ and $E_2$ are determinative upon desired concentrations of color in the first and second absorption states.

Conversely, when the display electrodes are to change from the second absorption state to the first absorption state, they are held at a potential $E_1'$ more negative than the $E_1$ ($E_1' < E_1$) for a predetermined period of time ($t_1$) and thereafter held at $E_1$ to maintain the first absorption state. The writing/erasing technique of the present invention is performed in this manner.

Figure 1:
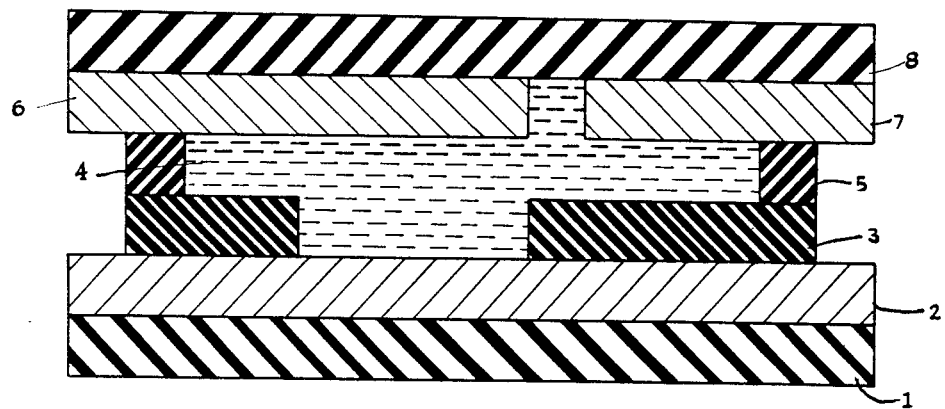
FIG. 1 is a cross sectional view of an electrochromic display cell.
Figure 2:
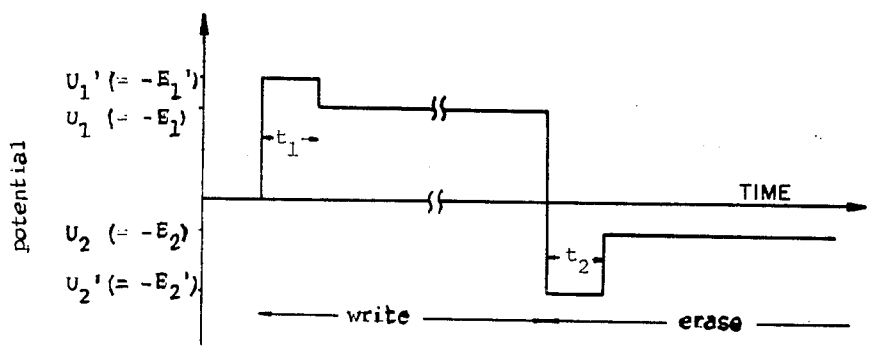
FIGS. 2(A) and 2(B) are potential and current waveforms employed for a driving technique of the present invention.
Figure 2:
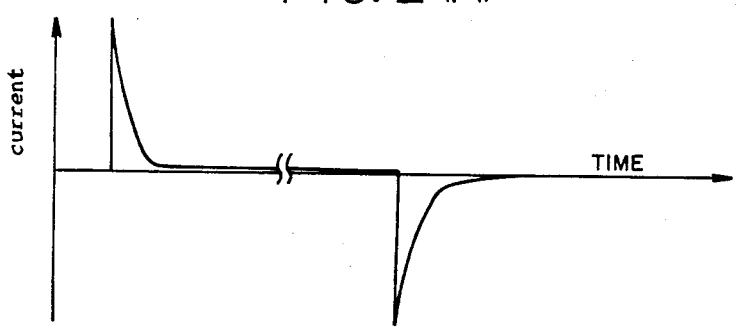

Referring now to FIGS. 2(A) and 2(B), a two-step waveform potential is applied to the electrochromic display cell in accordance with the concept of the present invention.

At first, in order to obtain a sufficiently high response speed in the write mode, the potential $E_1'$ more negative than the threshold potential $E_{th}$ is applied to the electrochromic display cell, the threshold potential being one that initiates the electro-chemical transformation of the electrochromic material. Needless to say, the equilibrium potential $E_1$ is slightly more negative than the threshold potential $E_{th}$. Subsequently, after desired contrast in the display is reached, the potential $E_1$ equal to or slightly more negative than the threshold potential $E_{th}$ is applied to the electro-optical display cell, thereby maintaining the display state or the first absorption state. A very little current flow during the period where the potential $E_1$ is applied. Therefore, maintenance of the display state requires at most a very low power. In the erase mode, the appropriate potential $E_2'$ of the opposite polarity to the writing potential $E_1'$ is applied to the display cell for the purpose of ensuring quick response. Then, the applied potential is decreased to the potential $E_2$. The waveform of current flowing through the display cell at these moments is depicted in FIG. 2(A). In case where the display electrodes and the reference electrode (or the counter electrode) are formed of the same material, the potential $E_2$ may be zero.

Once the display on the display cell is completely erased, the display cell may be electrically released from the driving circuit. In this way, the higher potential is first applied to assure a sufficiently high response speed and the lower potential is then applied to maintain the display or erase state with a very low power in both the write mode and the erase mode.

Figure 3:
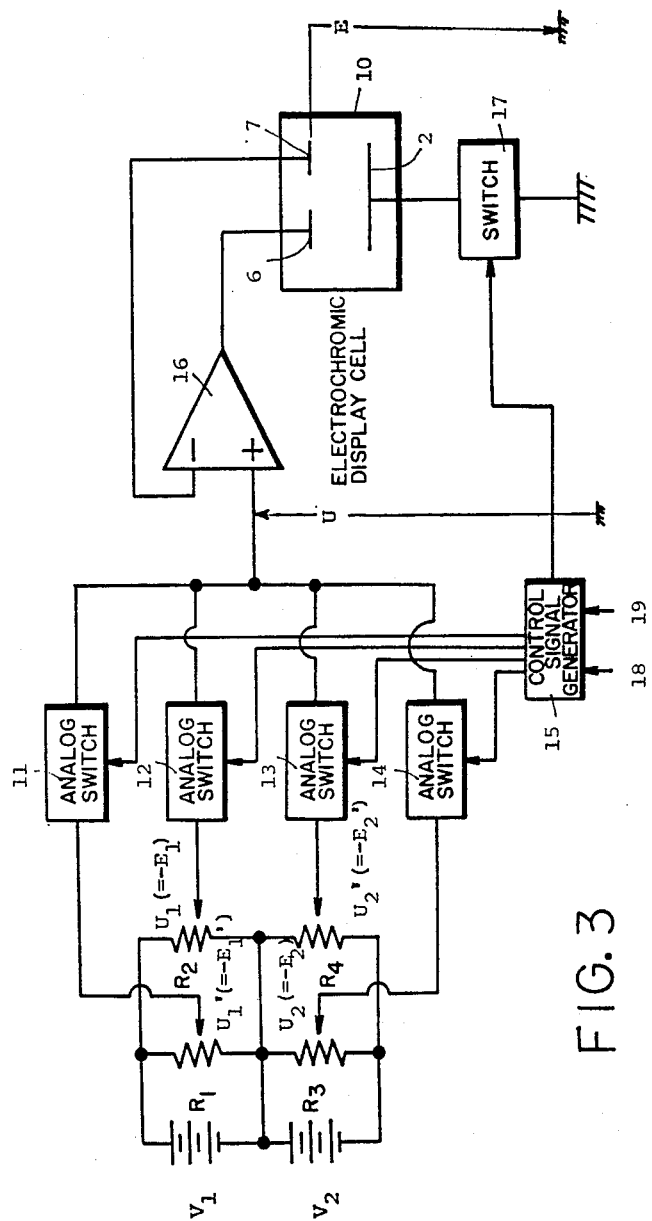
FIG. 3 is block diagram of a driving circuit capable of generating the driving potentials shown in FIG. 2(A).

FIG. 3 shows an example of the driving circuit for the electrochromic display cell 10 in accordance with the present invention, the driving circuit including DC voltage sources $V_1$ and $V_2$, variable resistors $R_1$-$R_4$ for the voltage adjustment, the resistor $R_1$ and $R_2$ for establishing the writing potential and the resistors $R_3$ and $R_4$ for the erasing potential, a plurality of analog switches 11-14, a control signal generator 15 responsive to write signals applied to a terminal 18 and erase signals applied to a second terminal 19, an operational amplifier 16, and a switching element 17 for selecting the display electrode to be driven. In the case where the display cell has conventionally a plurality of the display electrodes in a desired pattern, a plurality of the switching elements 17 is necessary. With such an arrangement, the write signals via the terminal 18 or the erase signals via the terminal 19 render the control signal generator 15 operative to turn on one of the analog switches 11-14 and the switching element 17. This results in that the potentials as shown in FIG. 2(A) are applied across the respective electrodes of the display cell.

In the driving circuit of FIG. 3, the constant potential driving manner is achieved as follows.

In general, when a pair of electrodes (cathode and anode) are provided within an electrolyte and a voltage is applied between the pair of the electrodes, the applied voltage is divided into three sections, a potential developed at the interface between the anode and the electrolyte, a potential developed at the interface between the cathode and the electrolyte and a voltage drop due to the resistance of the electrolyte. Since a ratio of such voltage division varies from time to time in accordance with chemical reactions caused by a flow of current, the electrochemical reactions about one of the electrodes are influenced under the condition of the other electrode.

The constant potential driving is capable of removing these influences, whereby the potential at the interface between the one electrode (the display electrode in the given example, although generally termed a test electrode) and the electrolyte is held constant. In this instance, a third electrode (corresponding to the reference electrode in the given example) is provided and the potential at the display electrodes is detected for the purpose of controlling the applied voltage at the counter electrode. Since the reference electrode serves just to detect the potential and a very little or no current flows therethrough, the potential developed at the interface between the reference electrode and the electrolyte is hardly varied. The influence of the voltage drop due to the resistance of the electrolyte also may be minimized by positioning the reference electrode closely adjacent the display electrodes. The potential of the display electrodes is sensed in this manner. In FIG. 3, if the potential U is positive, the potential of the display electrodes 2 is negative with respect to the reference electrode 7. It is understood that the designations E and U are opposite in polarity.

The inventors' experiments showed satisfactory results under the following conditions:

| the electrolyte (water solution) | N,N' diheptyl viologen difromide | 0.05 mol/l |
| --- | --- | --- |
| | potassium bromide | 0.3 mol/l |
| | ferrous-ammonium sulfate | 0.3 mol/l |
| the reference electrode | indium oxide | |
| $E_1 = -U_1 = -0.8$ to $-0.9$ V | determined by the composition of the electrolyte | |
| $E_1' = -U_1' = -1.2$ V | arbitrarily selectable to a certain extent | |
| $T_1 = 0.1$ to $0.5$ sec. | | |
| $E_2 = -U_2 = 0$ V | | |
| $E_2' = -U_2' = 0.5$ V | | |
| $T_2 = 0.1$ to $0.5$ sec. | | |

In accordance with the experiment results, the display cell could be disconnected from the driving circuit in one second after the erasure.

While particular representative embodiments and details have been shown for the purpose of those skilled in this art that various changes and modifications may be made without departing from the spirit or scope of the invention. Accordingly, the foregoing embodiments are not to be taken as delimiting examples but as exemplary structures of the invention defined in the claims.

We claim:

1. A constant potential driving method for an electro-optical display, the electro-optical display comprising an electrochromic material of which the visible light absorpotion property is reversibly varied by an electrochemical redox reaction, a redox pair which coexists with the electrochromic material, a predetermined number of display electrodes, a reference electrode and a counter electrode, the electrochromic material having a first visible light absorption state of which the equilibrium potential $E_1$ is negative and a second visible light absorption state of which the equilibrium potential $E_2$ is positive ($E_1 < E_2$), said constant potential driving method comprising the steps of:

holding the display electrodes at a potential $E_1'$ more negative than the equilibrium potential $E_1$ ($E_1' < E_1$) for a predetermined period of time ($t_1$) sufficient to constrain said electrochromic material to assume said first visible light absorption state and then at the equilibrium potential $E_1$ to maintain said first light absorption state in said electrochromic material when switching the latter from the second absorption state to the first absorption state; and holding the display electrodes at a potential $E_2'$ more positive than the equilibrium potential $E_2$ ($E_2' < E_2$) for a predetermined period of time ($t_2$) to constrain said electrochromic material to assure said second light absorption state and then at the equilibrium potential $E_2$ to maintain said second absorption state in said electrochromic material when switching the latter from the first absorption state to the second absorption state.

2. The constant potential driving method as set forth in claim 1 wherein the electro-optical display is electrically disconnected from a driving circuit after completing the electrochemical transformation from the first absorption state to the second absorption state and vice versa.

3. The constant potential driving method as set forth in claim 1 wherein the electrochromic material is colored in the reduced state, said reduced state being said first visible light absorption state, said electrochromic material being colorless in the oxidized state, said oxidized state being said second visible light absorption state.

4. An erasing method for an electro-optical display having an electrochromic material responsive to a write potential of a first polarity to transform from an erased state to a colored state, and having an erase threshold potential of opposite polarity to said write potential at which a transformation is initiated from a colored state to an erase state, comprising the steps of:

applying a first erase potential of said opposite polarity and of a magnitude greater than said erase threshold potential to said electrochromic material in said display over a preselected erase state enabling period shorter than the desired duration of a given erase state and of sufficient duration to initially create said erase state and initiate an erasing of said display; and immediately thereafter applying a second erase potential of said opposite polarity and of a magnitude less than said erase threshold potential to said electrochromic material in said display over the remaining duration of said erase state to maintain the said erase state created during said erase state enabling period for said desired duration and to complete the erasing of said display at said second erase potential.

5. The erasing method of claim 4, in combination with a writing method comprising the steps of:

applying a first write potential of said first polarity and of a sufficient magnitude to initially create a colored state of said display over a preselected colored state enabling period shorter than the desired duration of a given colored state; and immediately thereafter, for a period of the balance of said desired colored state duration, applying a second write potential of said first polarity and of lesser magnitude than said first write potential to said electrochromic material in said display to maintain the said colored state created during the said colored state enabling period for said desired duration of said colored state.

6. An erasing method for an electro-optical display having an electrochromic material responsive to a write potential of a first polarity to transform from an erased state to a colored state, and having an erase threshold potential of opposite polarity to said write potential at which a transformation is initiated from a colored state to an erase state, comprising the steps of:

applying a first erase potential of said opposite polarity and of a magnitude greater than said erase threshold potential to said electrochromic material in said display over a preselected erase state enabling period shorter than the desired duration of a given erase state and of sufficient duration to initially create said erase state and initiate an erasing of said display; and immediately thereafter, for a period of the balance of said desired duration, applying a second erase potential of said opposite polarity and a lesser magnitude than said first erase potential to said electrochromic material in said display to maintain the said erase state created during said enabling period for said desired duration and to complete the erasing of said display at said second potential.

7. The erasing method of claim 6, in combination with a writing method comprising the steps of:

applying a first write potential of said first polarity and of a sufficient magnitude to initially create a colored state of said display over a preselected colored state enabling period shorter than the desired duration of a given colored state; and immediately thereafter, for a period of the balance of said desired colored state duration, applying a second write potential of said first polarity and of lesser magnitude than said first write potential to said electrochromic material in said display to maintain the said colored state created during the said colored state enabling period for said desired duration of said colored state.

* * * * *